(12) United States Patent
Tyler et al.

(10) Patent No.: US 6,344,164 B1
(45) Date of Patent: Feb. 5, 2002

(54) PROCESS AND DEVICE FOR THE INJECTION MOLDING OF A PLASTIC MASS

(75) Inventors: Glenn Tyler; Prajak Chiradejnant, both of Bangkok (TH); Jürgen Bergedieck, Nürnberg; Ansgar Jaeger, Lauf, both of (DE)

(73) Assignees: Mannesmann AG, Düsseldorf (DE); Poranunt Company Ltd., Pravait (TH)

( * ) Notice: Subject to any disclaimer, the term of this patent is extended or adjusted under 35 U.S.C. 154(b) by 0 days.

(21) Appl. No.: 09/384,666

(22) Filed: Aug. 27, 1999

(30) Foreign Application Priority Data

Aug. 28, 1998 (DE) .......................................... 198 40 539

(51) Int. Cl.[7] .......................... B29C 45/27; B29C 45/56
(52) U.S. Cl. .............................. 264/328.8; 264/328.12; 425/573; 425/120; 425/574; 425/569
(58) Field of Search ....................... 264/328.12, 328.8, 264/328.11; 425/573, 574, 120, 567, 568

(56) References Cited

U.S. PATENT DOCUMENTS

| 3,356,242 A | * | 12/1967 | Cleereman | 264/328.12 |
| 3,907,952 A | * | 9/1975 | Cleereman | 264/328.12 |
| 4,303,382 A | * | 12/1981 | Gellert | 425/568 |
| 5,374,183 A | * | 12/1994 | Takeuchi | 425/568 |
| 5,804,125 A | * | 9/1998 | Aepli | 264/328.11 |

* cited by examiner

Primary Examiner—Robert Davis
Assistant Examiner—Thu Khanh T. Nguyen
(74) Attorney, Agent, or Firm—Cohen, Pontani, Lieberman & Pavane

(57) ABSTRACT

An injection unit for injecting plastic into a cavity of a mold includes an injecting device connectable between an extrusion die and the mold. The injecting device includes a mouth having a plurality of openings that is insertable into the mold so that the plastic flows through the plural holes into the mold. A drive is connectable to at least a portion of the injecting device for rotating the mouth portion and the plural opening of the injecting device about a central axis as the plastic flows through the holes into the mold.

17 Claims, 9 Drawing Sheets

PROCESS AND DEVICE FOR THE INJECTION MOLDING OF A PLASTIC MASS

BACKGROUND OF THE INVENTION

1. Field of the Invention

The invention relates to a process for the injection molding of a plastic mass via an injection element into a cavity with an injection device having an extrusion die connected to the cavity via multiple openings.

2. Description of the Related Art

A prior art injection molding process for producing plastic containers is disclosed in DE 196 17 349 Cl, in which thermoplastic material is pressed into the cavity of an injection molding mold via multiple tubular dies. The plastic material pressed into the injection molding mold through the annular passages of these dies retains the individual layers formed by the annular passages, even in the solidified state and thereafter.

A prior art injection molding extrusion die for the injection of plastics, hardenable resins and rubber is disclosed in EP 0 441 868 B1, in which the position of closing tube in the extrusion die housing is adjustable. Adjustment of the axial position of the closing tube creates a central material flow that is surrounded by a sleeve-shaped material flow supplied separately to the cavity. The material fed into the cavity flows in the same direction as the main axis of the injection molding device.

SUMMARY OF THE INVENTION

The object of the invention is to create an injection process and an injecting device that has a simple construction, uses as little energy as possible, and permits the plastic material to have a non-isotropic structure immediately before its entry into the cavity.

The object is attained by a process for injection molding a plastic mass in a cavity using an injection element, including the steps of feeding the plastic mass from the injection element into a cavity through a plurality of material supply openings which forms a plurality of independent flow strands, rotating a portion of the injection element which includes the plural material supply openings, and cutting off the injection by maintaining a rotation of the portion of the injection element having the plural material supply openings after the cavity is filled and cooled.

The object of the invention is also attained by an injection molding unit for injecting a plastic mass into a cavity in a mold, including an injecting device mountable between a machine extrusion die and the mold for receiving the plastic mass from the machine extrusion die and guiding the plastic mass to the cavity of the mold, said injecting device having a material supply part with a mouth portion and a central axis, said mouth portion connectable to the mold and having a plurality of openings through which the plastic mass flows, and a drive operatively connected to said material supply part for rotating said injecting device about said central axis.

According to the invention, the plastic mass is fed into the cavity in a plurality of independent flow threads via the material supply part. The material supply part that produces the flow threads is rotated so that the individual flow threads are turned relative to each other and thoroughly mixed.

The free area of the openings of the material supply part is larger than the diameter of the material supply line in the injection molding machine extrusion die. As a result, there is only a slight pressure build-up in the material supply part during injection into the cavity. For this reason, less total energy is used, specifically, during injection and for the closing force.

Moreover, due to the rotary flow, a lesser quantity of material is required, and the material used is less subjected to shear stress. In addition, the better overall orientation of the plastic material allows products to be produced with significantly thinner wall thicknesses.

After the cavity is filled and cooled, injection is cut off by maintaining the rotation of the material supply openings. As a result, the injection points are equally clean as those known from point connection.

The flow threads may have any desired cross-sectional shape including circular and rectangular, the cross-sections being provided by rings arranged concentrically relative to a central one of the openings.

In an advantageous embodiment, particularly in the case of circular-symmetrical products with small wall thicknesses, e.g., buckets, no confluence points (binding seams) are created, despite the enlarging injection area, because the plastic material injected through the center one of the openings precedes that emerging from the other openings.

The material supply part that feeds the plastic mass to the cavity may comprise many different forms. In one embodiment, this part has a plurality of circular borings that are connected to the central boring of the machine extrusion die.

Although the structure of this material supply part resembles that of the machine extrusion die, the material supply part is also connected to a drive, via which it is placed into rotation. A motor (which, as applicable, is integrated in the mold) drives a pinion, which communicates with the material supply part.

In another embodiment, the material supply part comprises a pot, with a bottom that rests in the fixed mold part and the other end of which is mounted on the machine extrusion die. The entire pot may be placed into rotation by the drive. The inner part of the pot forms a chamber, in which the plastic material is evenly distributed before being injected into the cavity. The openings in the bottom have different diameters. The diameters of the outlying openings are smaller than the central opening and the distance through these outlying openings is longer than that of the central opening.

In another embodiment, the material supply part is constructed in the form of a sleeve which constitutes a connection from the injection molding machine to the mold. In one embodiment, the entire bottom is driven. In another embodiment, one end of the sleeve rests directly on the mold and the bottom is arranged inside the sleeve such that the bottom is drivable through a passage in the side wall.

In a further embodiment, a torpedo-like projection is connected to the bottom of the material supply part. The torpedo-like projection may be placed into rotation from outside the sleeve via an electromagnetic drive.

For especially targeted guidance of the plastic material threads which are fed to the cavity, an impact plate may be provided in the cavity across from the central opening of the material supply part. This impact plate has a crater that guides the plastic material evenly to all sides in the cavity.

The various features of novelty which characterize the invention are pointed out with particularly in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
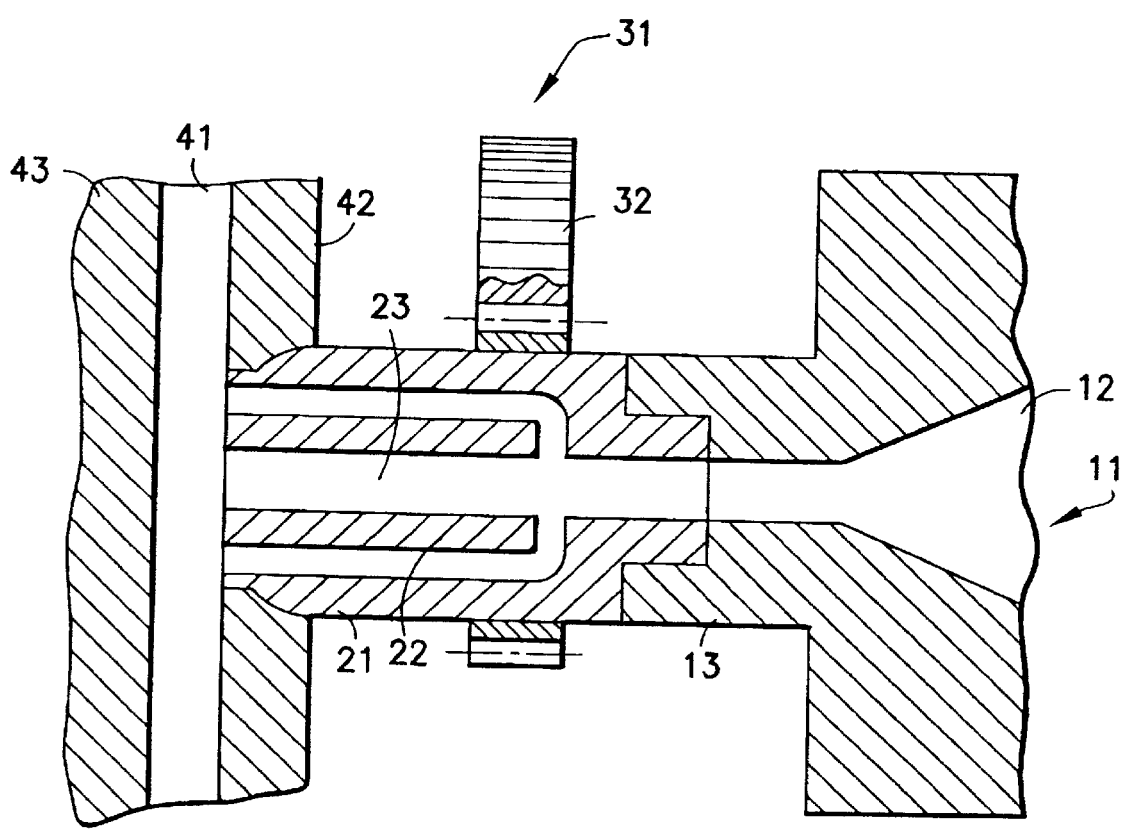
FIG. 1 shows a material supply part with a plurality channels according to an embodiment of the present invention.
Figure 4:
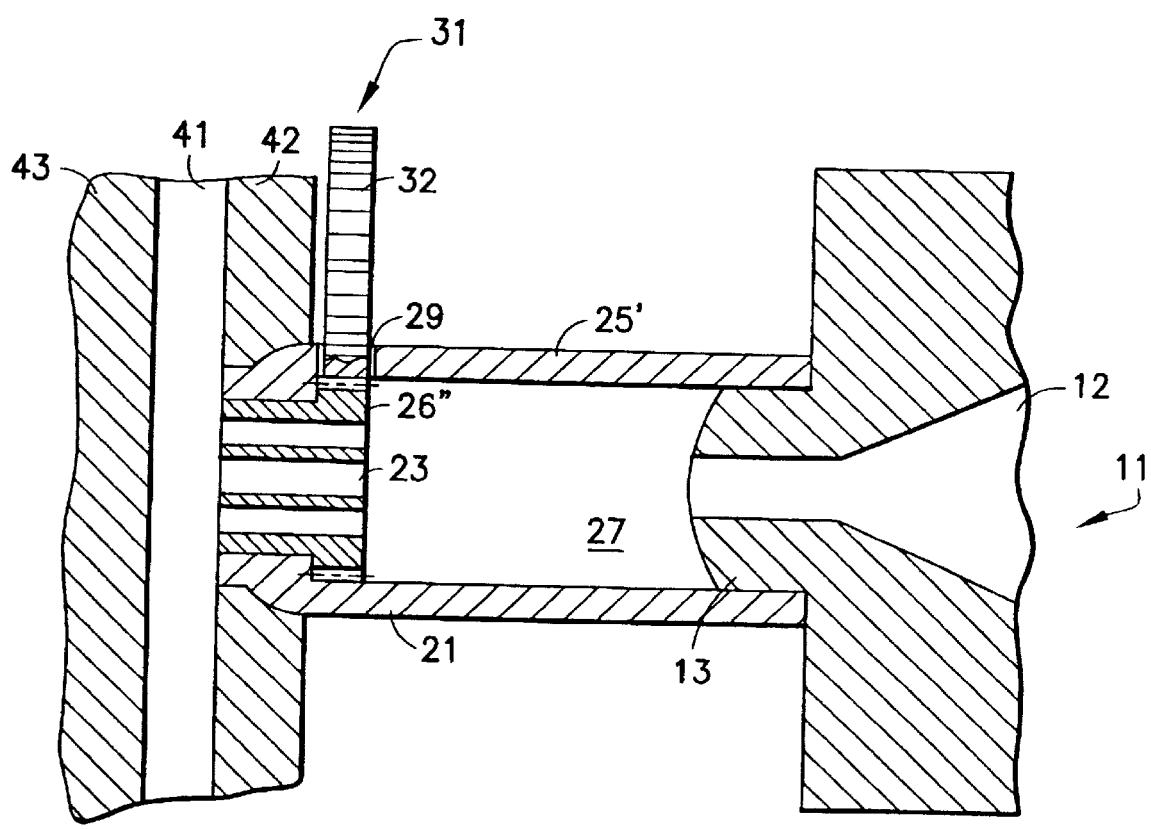
FIG. 4 shows another embodiment of the material supply part with a movable bottom according to FIG. 3.
Figure 5:
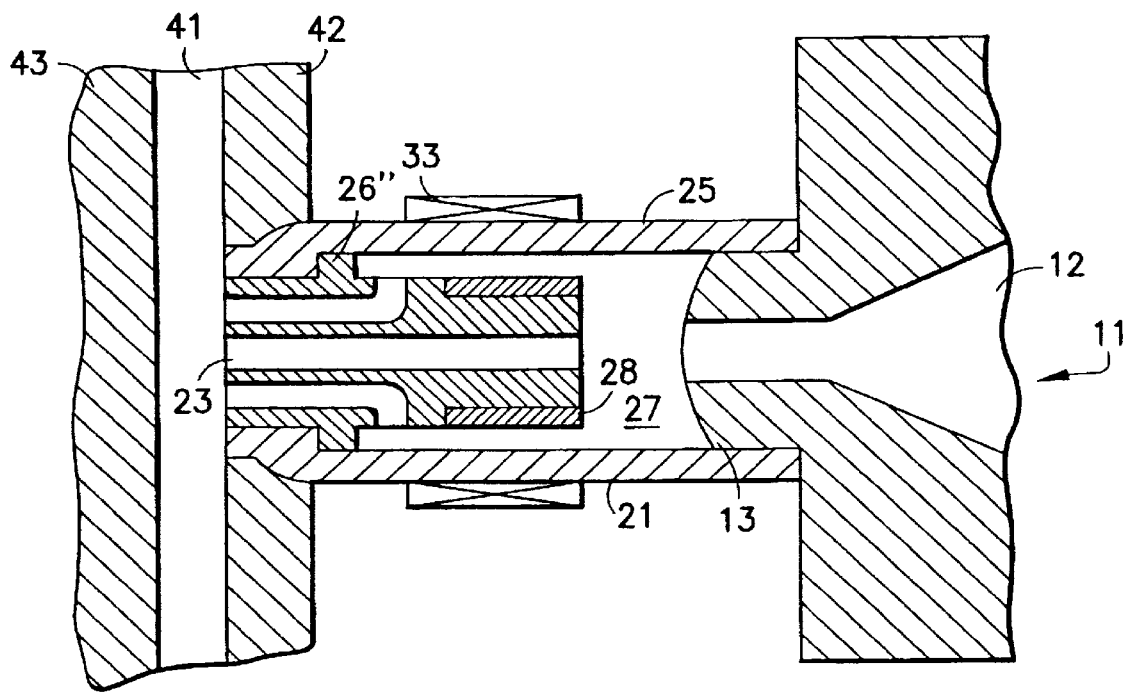
FIG. 5 shows a material supply part having a rotatable bottom connected to a torpedo-shaped drive according to yet another embodiment of the present invention.

FIGS. 1 and 5 each show a portion of an injection device 11 including a connecting line 12 to a cavity 41 formed by the fixed mold 42 and a movable mold plate 43. The connecting line 12 is arranged through a machine extrusion die 13. A material supply part 21 is arranged between the machine extrusion die 13 and the fixed mold 42. In addition, a drive 31, which includes a pinion 32 in FIGS. 1 through 4, is connected to the supply part for rotating at least a bottom 26 of the material supply part 21.

Referring now to FIG. 1, the material supply part 21 comprises a cylinder made of solid material, in which openings 23 are created as channels. These openings 23 are embodied such that a central one of the openings 23 has the largest diameter and also has the shortest length. The openings outside of the center have smaller diameters than the central one of the openings 23 and are longer. This configuration ensures that the initial flow through the central one of the openings precedes the other flow threads during injection of the plastic mass.

Figure 2:
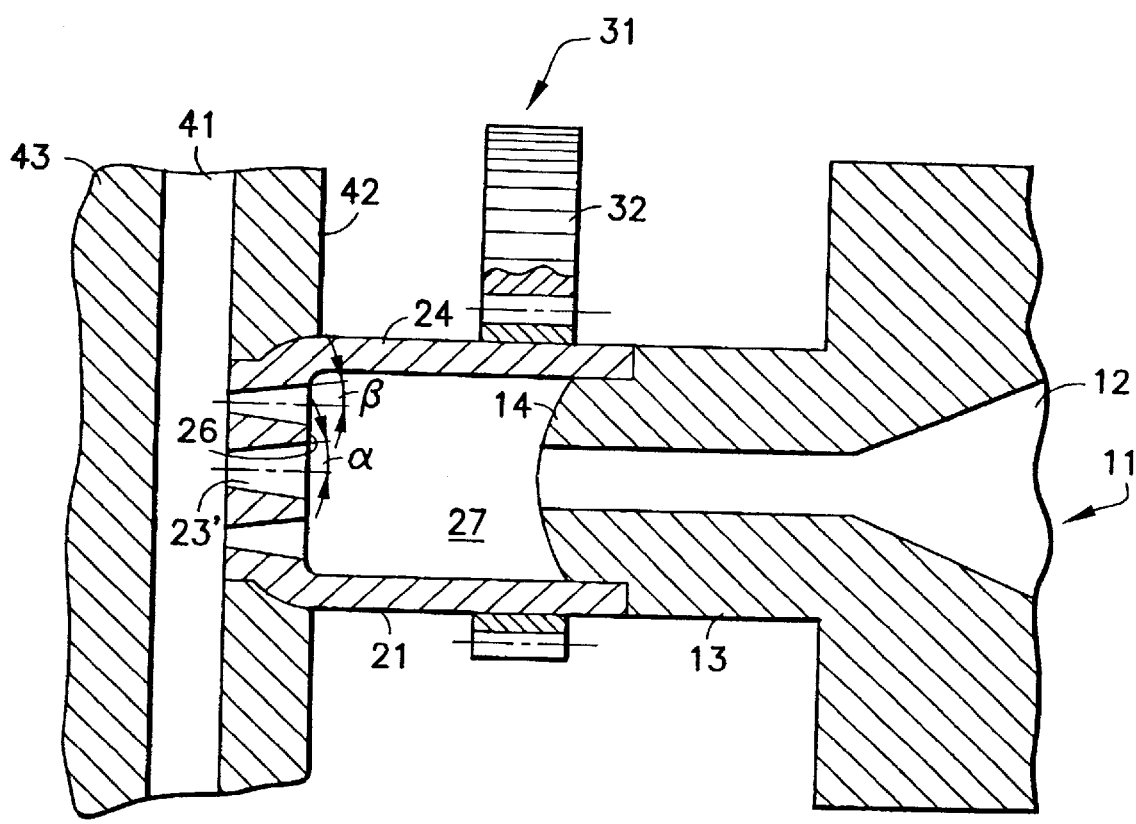
FIG. 2 shows a pot-shaped material supply part according to another embodiment of the present invention.

In FIG. 2, the material supply part 21 comprises a pot 24 having an open end that is mounted onto a head 14 of the machine extrusion die 13. The bottom 26 of the pot 24 has openings 23' that run conically in the flow direction. The center one of the openings 23 has an angle $\alpha$ with respect to the longitudinal axis of the connecting line 12 that is clearly larger than the angle $\beta$ of the other openings 23. In this embodiment, a chamber 27 is located between the head of the machine extrusion die 14 and the bottom 26 of the pot 24. The plastic mass mixes in the chamber 27 before being fed to the cavity 41.

Figure 3:
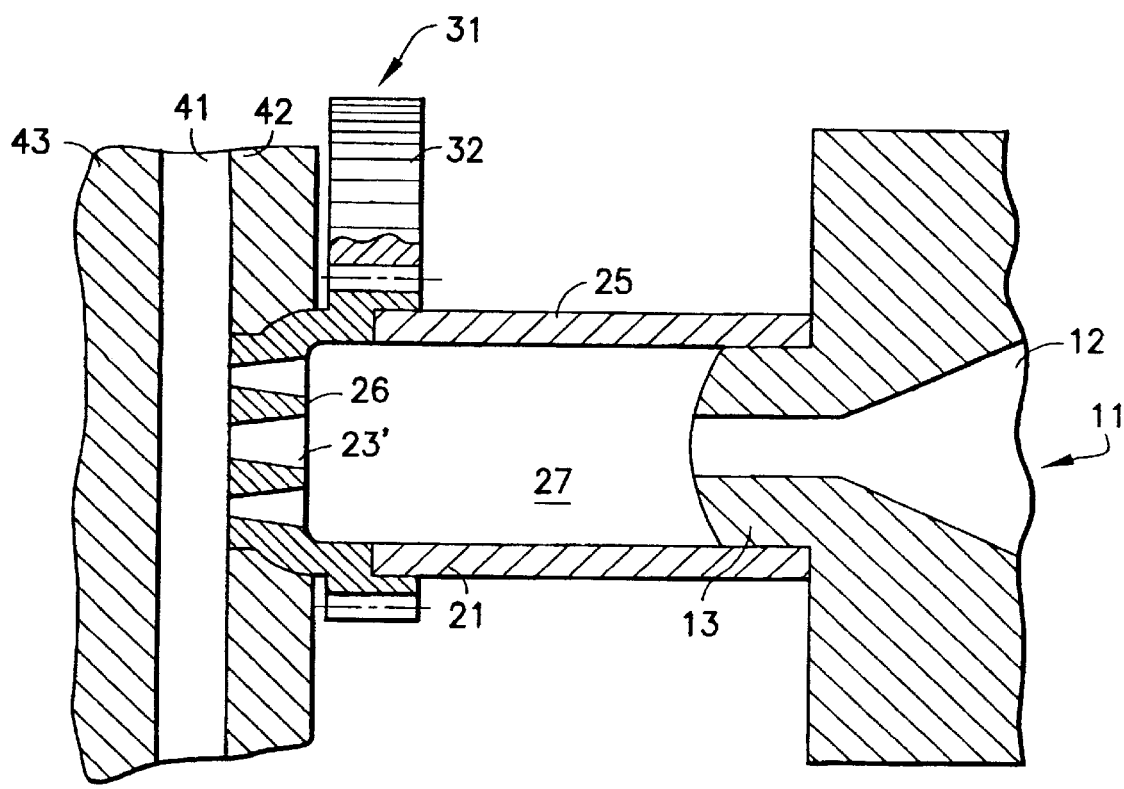
FIG. 3 shows a material supply part comprising a sleeve with a movable bottom according to another embodiment of the present invention.

In FIG. 3, the material supply part 21 comprises a sleeve 25. A bottom 26' of the sleeve 25 is rotatable by the drive 31.

In FIG. 4, the material supply part 21 comprises a sleeve 25' that is clamped between the machine extrusion die 13 and the fixed mold 42. The bottom 26" is located inside the sleeve 25' and is driven from the outside via a pinion 32. The bottom 26' is connected with the pinion 32 through a passage 29 in the wall of the sleeve 25'.

The embodiment shown in FIG. 5 also includes a sleeve 25' that is clamped between the machine extrusion die 13 and the fixed mold. In contrast to FIG. 4, the sleeve 25' of this embodiment is completely closed. To rotate the bottom '26, torpedo-shaped projection 28 is connected to the bottom 26". The torpedo-shaped projection 28 rotatably driven by an electromagnetic drive 33 that is attached to the outer wall of the sleeve 25.

In each of the embodiments shown in FIGS. 1–5, the openings 23 in the bottom 26 have dimensions that cause the plastic mass to run through the central one of the openings 23 first, ahead of the other flow threads.

Figure 6A:
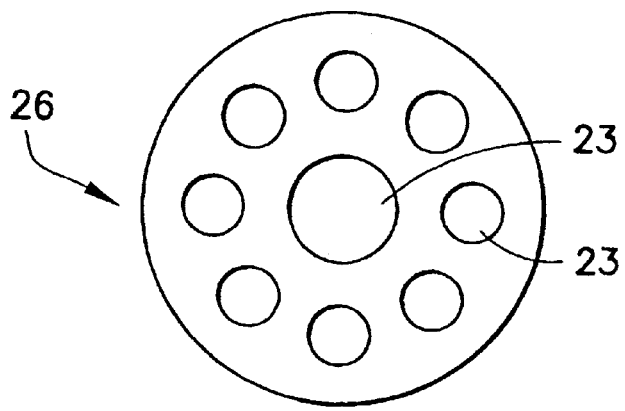
FIGS. 6a–6c are front views of different embodiments of a bottom of a material supply part with different forms of openings.
Figure 6B:
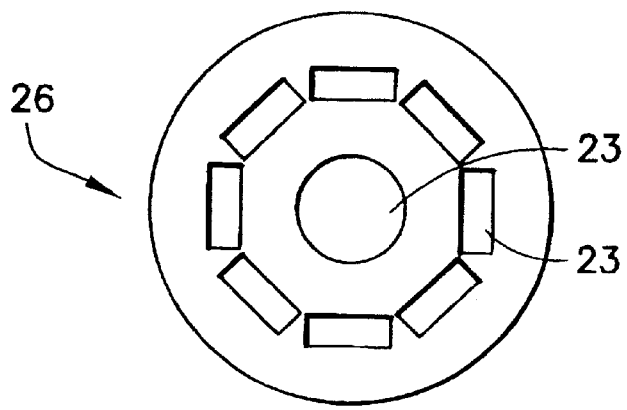
Figure 6C:
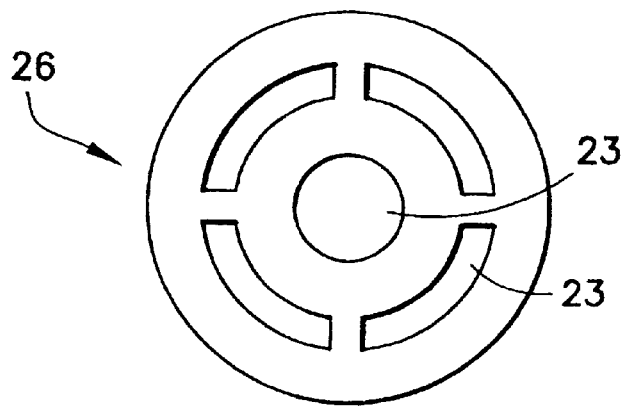

FIGS. 6a–6c show top views of the bottom 26 in which the openings 23 are provided. In FIG. 6a the openings 23 comprise circular borings or channels. In FIG. 6b the central opening is circular and the surrounding openings 23 are shown as rectangles, in which the length/width ratio is greater than 2. In FIG. 6c the rectangular openings 23 are arranged in the form of a ring around the center.

Figure 7:
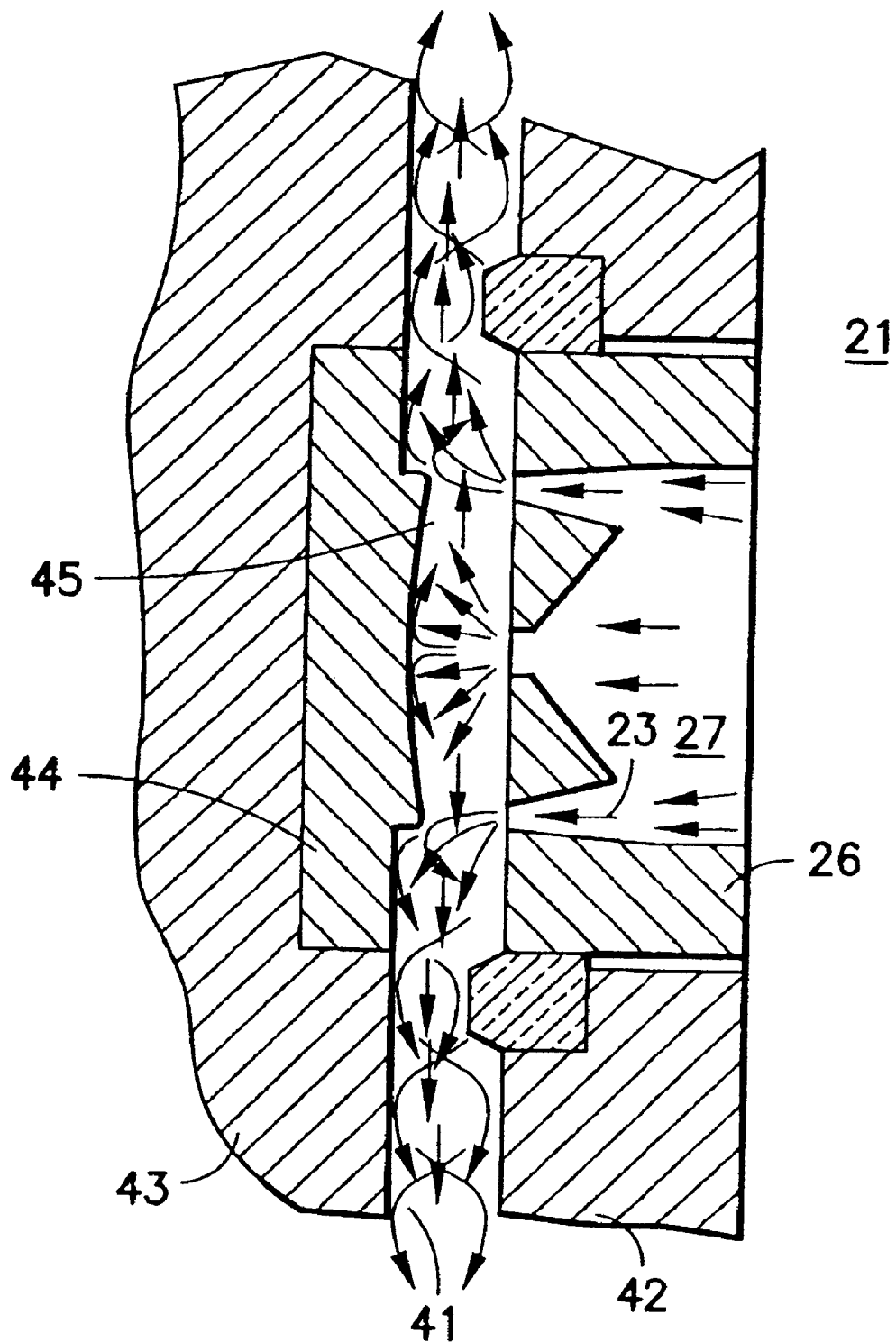
FIG. 7 shows an impact plate insertable in a cavity which receives the plastic mass.

FIG. 7 shows a detail of the cavity 41 formed by the movable mold plate 43, the fixed mold 42, and the bottom 26 of the material supply part 21. An impact element 44 is arranged on the inner side of the movable mold plate 43 with a crater 45 formed thereon.

The individual arrows in FIG. 7 show the movement directions of the flow threads, which make their way from the chamber 27 through the openings 23 into the cavity 41. The plastic material that runs through the central one of the openings into the cavity 41 hits the impact plate 44 and is evenly distributed to the cavity from there.

Figure 8A:
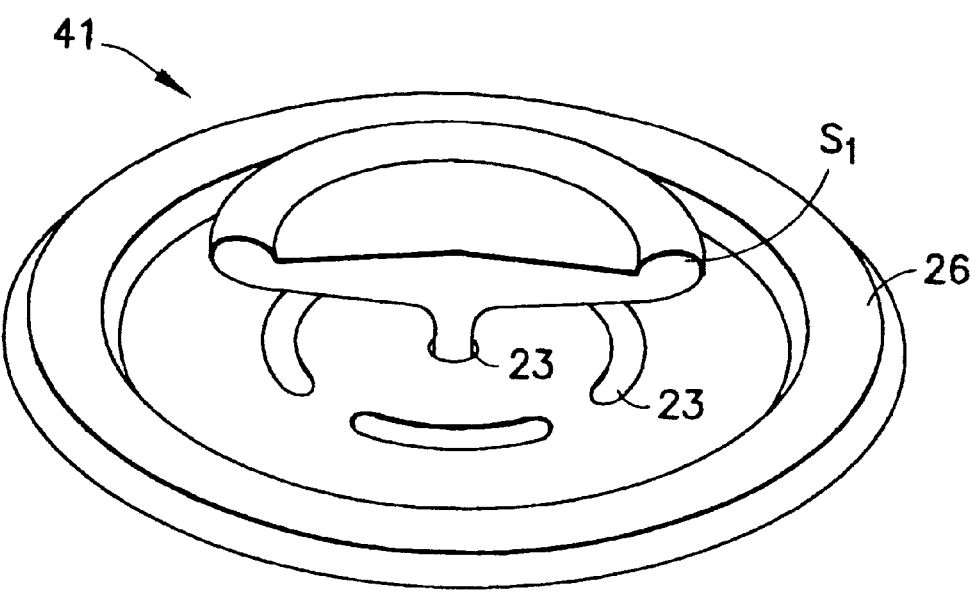
FIG. 8a is a graphical depiction of the flow behavior of the plastic mass in the area of injecting showing the flow through the central opening according to the present invention.
Figure 8B:
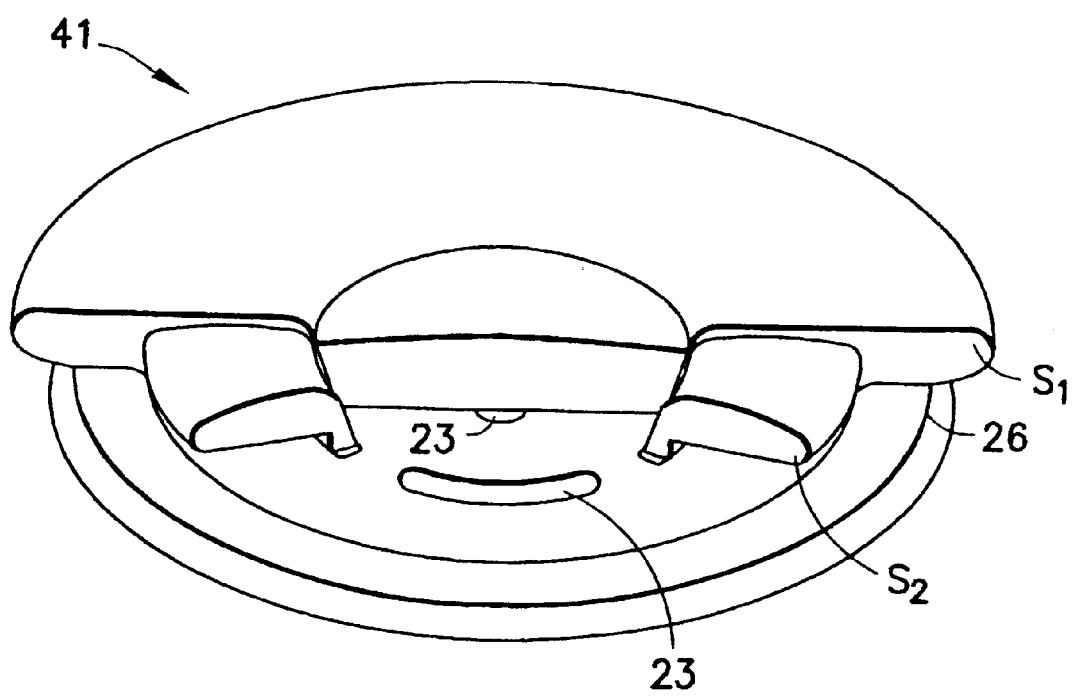
FIG. 8b is a graphical depiction of the flow behavior of the plastic mass in the area of injection showing the flow through all of the openings according to the present invention.

FIG. 8a illustrates a particular moment during the injection process at which a melt $S_1$ runs through the central opening of the bottom 26 into the cavity, where it spreads out in the manner of a mushroom against the impact plate 44 (not shown in FIG. 8a) before the plastic mass in the outer openings 23 reaches the cavity 41. FIG. 8b shows that the melt $S_1$, which runs through the central opening 29, is so far ahead of the melt $S_2$, which runs through the outer opening 23, that the melt $S_2$ is surrounded by the melt $S_1$ when the melt $S_2$ enters the cavity 41.

Figure 9:
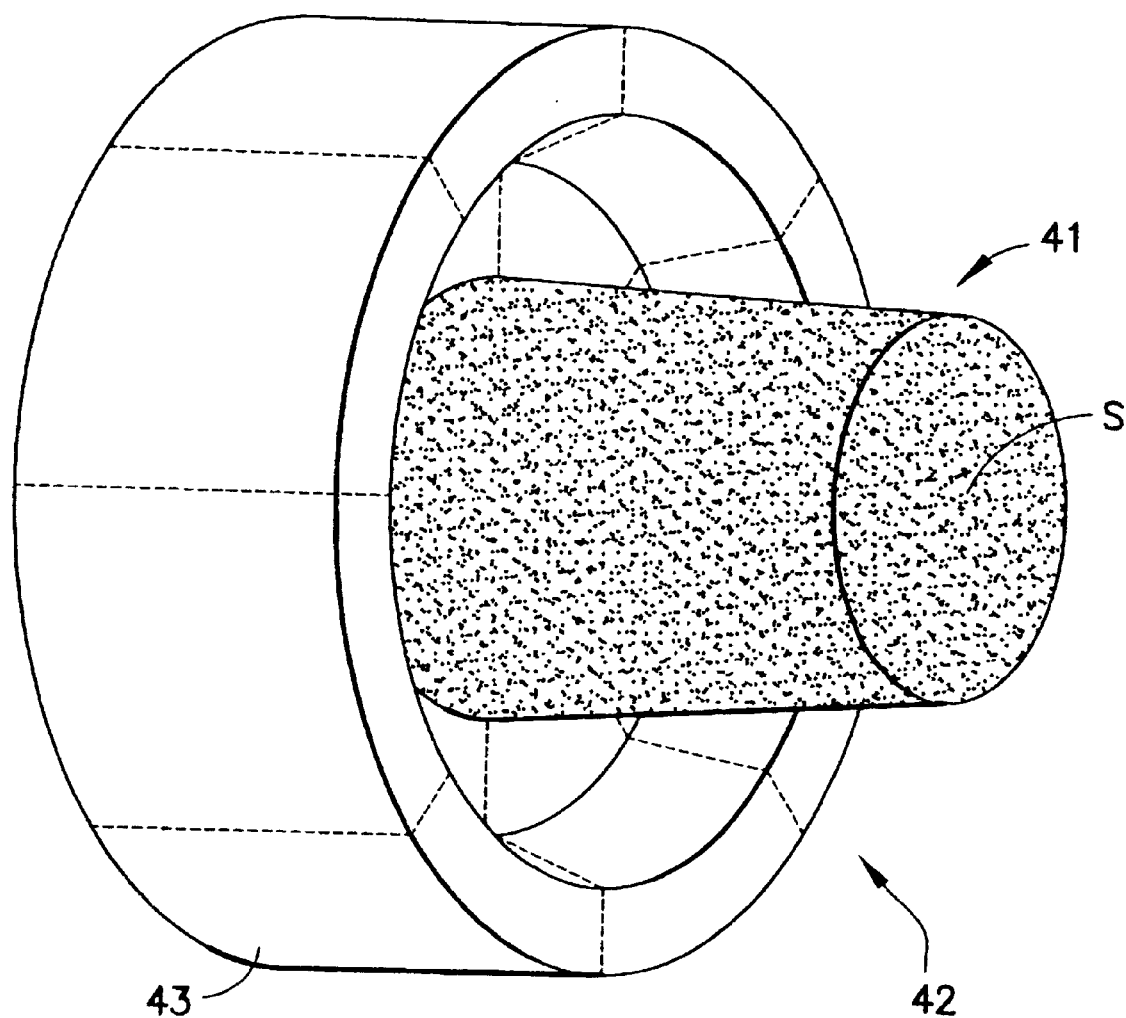
FIG. 9 is a graphical depiction of the flow behavior of the plastic mass in the entire mold.

FIG. 9 illustrates the flow threads S in the cavity 41 at a particular moment. The depicted mold 42, 43 represents a bucket, for example. It is clear the flow threads are introduced into the cavity in the form of a spiral. This occurs because the material supply part 21 is rotated as the plastic mass passes through it.

The invention is not limited by the embodiments described above which are presented as examples only but can be modified in various ways within the scope of protection defined by the appended patent claims.

We claim:

1. A process for injection molding a plastic mass in a cavity using an injection element, comprising the steps of:

feeding the plastic mass from the injection element into a cavity in a mold by feeding the plastic mass through a plurality of material supply openings such that a plurality of independent flow strands of the plastic mass are fed to the cavity;

rotating a portion of the injection element having the plural material supply openings; and cutting off the injection by maintaining a rotation of the portion of the injection element having the plural material supply openings after the cavity is filled and cooled.

2. The process of claim 1, said step of feeding comprises forming a plurality of circular flow strands said plural material supply openings.

3. The process of claim 1, said step of feeding comprises forming a plurality of rectangular flow strands through said plural material supply openings with a length/width ratio of greater than 2:1.

4. The process of claim 1, wherein said step of feeding comprises feeding said plastic mass through said plural material supply openings such that a flow strand through a central one of said plural material supply openings precedes the others of the plural flow strands.

5. An injection molding unit for injecting a plastic mass into a cavity in a mold comprising:

an injecting device mountable between a machine extrusion die and the mold for receiving the plastic mass from the machine extrusion die and guiding the plastic mass toward the cavity of the mold;

said injecting device having a material supply part with a mouth portion and a central axis, said mouth portion connectable to the mold and having a plurality of openings through which the plastic mass flows; and a drive operatively connected to said material supply part for rotating said mouth portion of said injecting device having said plural openings about said central axis.

6. The injection molding unit of claim 5, wherein said material supply part comprises a port arrangable on a head portion of the machine extrusion die, and a central one of said plural openings is arranged in a center of said mouth portion and is coaxial relative to said central axis.

7. The injection molding unit of claim 5, wherein said material supply part comprises a sleeve having a receiving end that is arrangable for surrounding the machine extrusion die and a bottom end comprising said mouth portion; and said material supply part further comprising a chamber forming a buffer arranged between said bottom end and said receiving end of said sleeve.

8. The injection molding unit of claim 7, wherein said mouth portion is connected to said drive via pinions for rotating independently of said sleeve.

9. The injection molding unit of claim 5, wherein said plural openings have a total free passage surface $(A_{ges}) \geq 1.3$ times the cross-sectional area $(A_D)$ of a feed line of the machine extrusion die.

10. The injection molding unit of claim 9, wherein said plural openings comprise borings arranged on circular arcs relative to a center of said mouth portion, and wherein diameter of said borings decreases with their distance from said central axis.

11. The injection molding unit of claim 9, wherein said plural openings comprise substantially rectangular passages having length/width ratio $(l/w) \geq 2$.

12. The injection molding unit of claim 9, wherein said plural openings comprise portions of rings arranged concentrically relative to a center of said mouth portion with a greater length (l) than width (w).

13. The injection molding unit of claim 5, wherein said plural openings run conically in the flow direction of said plastic mass.

14. The injection molding unit of claim 13, the side of a central one of said plural opening has an angle ($\alpha$) with respect to said central axis that is larger that is larger that an angle ($\beta$) of the sides of the other openings.

15. The injection molding unit of claim 5, wherein said drive is attachable to said mold.

16. The injection molding unit of claim 7, further comprising a projection connected to said bottom, and wherein said drive comprises an electromagnetic drive mounted around said sleeve for rotating said projection.

17. The injection molding unit of claim 5, further comprising an impact element having a crater mountable in said cavity.

* * * * *